(12) United States Patent
Mourar et al.

(10) Patent No.: US 8,378,279 B2
(45) Date of Patent: Feb. 19, 2013

(54) PORTABLE INTEGRATED LASER OPTICAL TARGET TRACKER

(75) Inventors: Edward R. Mourar, Glenmoore, PA (US); Mario Carlo, Willow Grove, PA (US); Ilias Syrgabaev, Newtown, PA (US)

(73) Assignee: Fraser-Volpe, LLC, Warminster, PA (US)

( * ) Notice: Subject to any disclaimer, the term of this patent is extended or adjusted under 35 U.S.C. 154(b) by 262 days.

(21) Appl. No.: 12/886,888

(22) Filed: Sep. 21, 2010

(65) Prior Publication Data

US 2011/0121159 A1 May 26, 2011

Related U.S. Application Data

(60) Provisional application No. 61/263,560, filed on Nov. 23, 2009.

(51) Int. Cl.
 *G01S 17/00* (2006.01)
(52) U.S. Cl. ....... 250/203.2; 356/153; 42/113; 89/41.05
(58) Field of Classification Search ............... 250/203.1, 250/203.2; 356/153; 42/113; 89/41.05–41.09
See application file for complete search history.

(56) References Cited

U.S. PATENT DOCUMENTS

| | | | |
|---|---|---|---|
| 4,949,089 A | 8/1990 | Ruszkowski, Jr. | |
| 5,118,186 A * | 6/1992 | Schratzenstaller et al. ... | 356/153 |
| 5,267,016 A | 11/1993 | Meinzer et al. | |
| 5,831,718 A | 11/1998 | Desai et al. | |
| 5,926,260 A | 7/1999 | Dunne et al. | |
| 6,023,322 A | 2/2000 | Bamberger | |
| 6,650,404 B1 | 11/2003 | Crawford | |
| 6,769,347 B1 * | 8/2004 | Quinn ......................... | 89/41.05 |
| 6,810,293 B1 | 10/2004 | Chou et al. | |
| 7,295,296 B1 | 11/2007 | Galli | |
| 7,436,493 B2 | 10/2008 | McConville et al. | |
| 2002/0180866 A1 | 12/2002 | Monroe | |
| 2007/0097351 A1 | 5/2007 | York et al. | |
| 2007/0180751 A1 * | 8/2007 | Joannes ......................... | 42/113 |
| 2008/0013080 A1 | 1/2008 | Rogitz | |
| 2009/0265974 A1 * | 10/2009 | Joannes ......................... | 42/113 |

OTHER PUBLICATIONS

SeeSPOT® III+, High Performance, Handheld Thermal and Laser Spot Imager, FLIR Government Systems, www.flir.com/GS 04232008. 2008.
SeeSPOT III™, FLIR Systems, Ground Systems, www.flir.com/spt, 2002.

(Continued)

*Primary Examiner* — Seung C Sohn
(74) *Attorney, Agent, or Firm* — Volpe and Koenig, P.C.

(57) ABSTRACT

A portable integrated laser optical target tracker and designator (PILOTT device) in a single housing is provided having a laser designator assembly to produce a focused laser beam that is projected from the housing. A laser energy detector is located in the housing that detects reflected laser energy from any designation source (ground or airborne based), provides steering information, decodes the laser's frequency, and is used as a range finding receiver. The location of the laser energy provides automatic field alignment of the laser designator. An optical magnification scope is mounted in the housing and has an optical field of view that is parallel to and aligned with a beam path defined by the laser beam focusing optics. Any night scope can be added to the system to provide night situational awareness by being shown in the display. A visual electronic display is overlaid with the optical field of view. A main controller communicates with the controller of the laser energy detector and the visual electronic display, as well as a user input in order to control the PILOTT device. This allows the laser designation location to be displayed in the optical field of view, along with other data, for spotting, ranging and/or marking a designated target.

17 Claims, 11 Drawing Sheets

OTHER PUBLICATIONS

Elbit Systems of America, AN/PAS-22, Long Range Thermal Imager (LRTI), www.elbitsystems-us.com, date unknown.

Elbit Systems of America, PLDR, Portable Lightweight Designator/Rangefinder, www.elbitsystems-us.com, date unknown.

Advanced Ultra Lightweight Laser Designator (ULLD), User Manual for version 4 configuration, FIBERTEK, Inc., pp. 1-22, date unknown.

Ultra-Lightweight Laser Designator (ULLD), prototype developed for US Army NVESD/PM Sensors and Laser, date unknown.

Northrop Grumman Electronic Systems, GLTD II, Ground Laser Target System, www.northropgrumman.com, date unknown.

Northrop Grumman Electronic Systems, Lightweight Laser Designator Rangefinder LLDR, www.northropgrumman.com, date unknown.

Special Operations Forces Laser Rangefinder Designator (SOFLAM), date unknown.

* cited by examiner

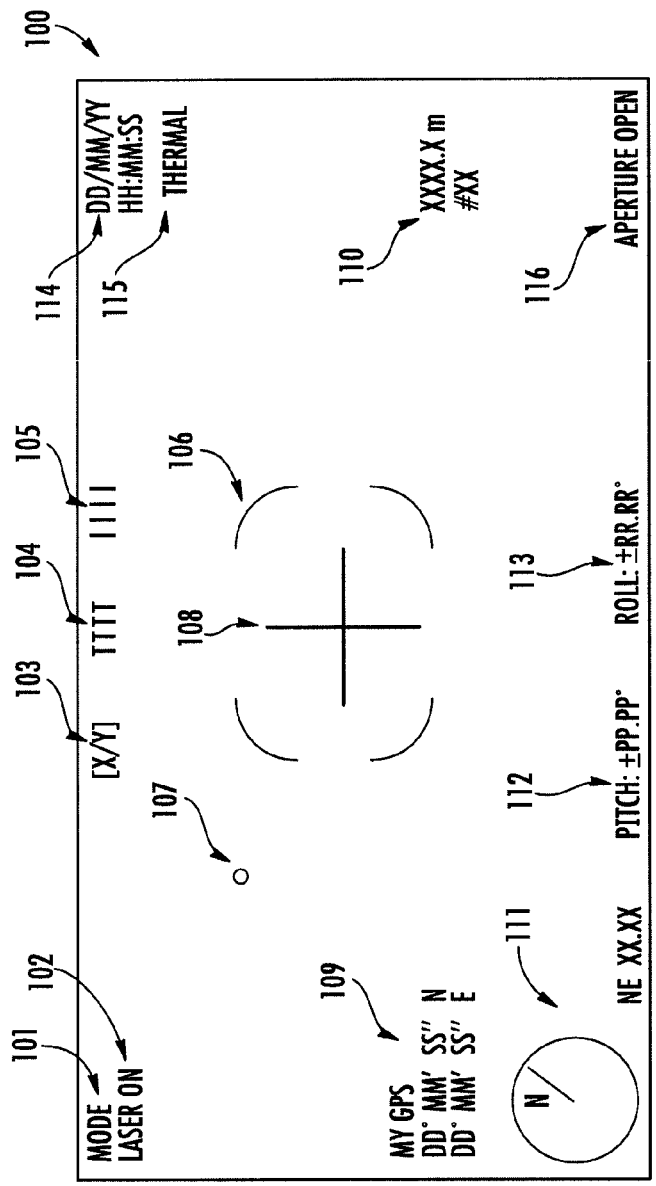
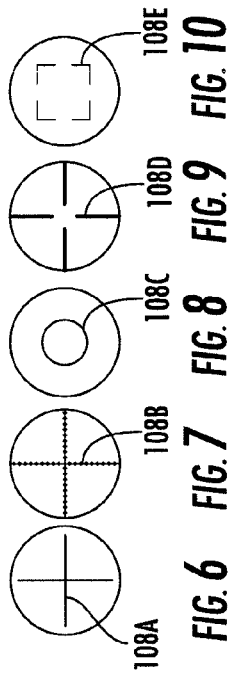
FIG. 5
FIG. 6  FIG. 7  FIG. 8  FIG. 9  FIG. 10

PORTABLE INTEGRATED LASER OPTICAL TARGET TRACKER

CROSS-REFERENCE TO RELATED APPLICATIONS

This application claims the benefit of U.S. Provisional Patent Application No. 61/263,560, filed Nov. 23, 2009, which is incorporated herein by reference as if fully set forth.

FIELD OF INVENTION

The invention relates to a laser designating and spotting system for targeting applications.

BACKGROUND

There are multiple military applications for laser designation and spotting systems. The currently known systems rely on a number of separate instruments for laser designating a target as well as for spotting and/or tracking a laser designation to ensure that the proper target has been acquired and marked. Generally, three to four separate pieces of equipment must be carried by a ground observer to a spotting and designating site within about six to eight kilometers of the target area in order to mark, range and/or track a target to be designated, and then relay information regarding the target to an ordinance delivery system or personnel. The ground observer based laser designator is placed on a separate stand by a user and aimed at the desired target. A separate piece of spotting equipment is utilized to detect the laser designation and then confirm whether the proper target has been designated. Current thermal scopes or night vision equipment is also separately used and have some form of laser spot detection capabilities. Because these thermal scope have laser spot detectors incorporated, they must be used with laser designator during day and night. Each of these pieces of equipment requires separate maintenance, and has a high cost, poor spot detection performance, and weight factor, which is of particular importance to field personnel carrying the equipment to a spotting site.

It would be desirable to provide the current laser designating performance in the 6 to 8 km range while lowering both the cost and weight. It would be further beneficial to add additional capabilities to the same piece of equipment so as to enhance functionality of a portable integrated laser optical target tracker that provides spotting, ranging, marking and tracking capabilities in one lightweight package.

SUMMARY

Briefly stated, the invention provides a portable integrated laser optical target tracker and designator (PILOTT device) in a single housing. This can also be referred to as a Lightweight Precision Effects Targeting System (L-PETS device), and the references in this document to the construction and use of the PILOTT device apply equally to a L-PETS device. A laser designator assembly is located in the housing and includes a laser beam generator, a laser controller and laser beam telescope optics to produce a collimated laser beam that is projected from the housing. The laser beam generator, laser controller, and the laser beam optics are mounted on a unitary laser assembly support connected to the housing. A laser energy detector is located in the housing that detects reflected laser energy. Preferably, the laser energy detector is a quadrant detector, but could also be two linear InGaAs APD arrays, enhanced CCD, InGaAs SWIR camera or a combination of such. An optical magnification scope is mounted in the housing and has an optical field of view that is parallel to and aligned with a beam path defined by the laser beam optics. A visual electronic display, preferably an OLED, is overlaid with the optical field of view. A main controller communicates with the laser controller of the laser designator, a laser energy detector and the visual electronic display, as well as a user input in order to control the PILOTT device. A three-axis digital magnetic compass is located in the housing that provides a bearing direction or heading signal to the controller and an inclination, preferably in the form of pitch and roll to the controller. An internal or external GPS device provides location (latitude and longitude) and timing services. The user input for activating the controller is at least one of located on or connected to the housing, preferably allowing for user control without the need to handle the housing.

The PILOTT device is configured to range find by signaling the laser controller to emit a single laser pulse. A reflection of the laser beam from a designated target that has been detected is received by the laser energy detector, and the laser energy detector controller calculates the time of flight of the laser beam from and to the designated target and a distance based on the time of flight. The PILOTT device can also laser designate the target by receiving a user input frequency, preferably a Triservice code, and signaling the laser controller to produce and emit a laser beam at the user input frequency. The reflected energy from the designated target is received by the laser energy detector and the reflected laser energy frequency is verified to avoid false readings. A location of the target designated by the laser beam is received by the controller which generates a signal to the display to show a laser dot in the optical field of view that indicates the target being designated by the laser beam. Additionally, the controller can provide steering information to the user via the display in order to allow user adjustment of the laser beam position so that the proper target is designated. The signal strength of the detected laser is preferably also produced by the controller as well as tracking up to three laser designators within it field of view. These lasers can be ground laser designators as well as airborne-generated laser designators. The PILOTT device further allows for a selection of an electronic optical reticle in the optical field of view of the user for targeting purposes. The controller can preferably also electronically adjust the reticle position to align it with the path of the laser beam optics in order to bore site the device. The PILOTT device preferably also allows adjustment of the on-screen-display color to provide contrast against the visual direct-view background. The reticle is generated by the electronics and overlaid with the direct-view optics using a microdisplay and a beam combiner. The center of the reticle is calculated using the quadrant detector and overlaid on the lased target.

Preferably, the PILOTT also includes inputs connected to the controller for GPS, for example from a defense advanced GPS receiver (DAGR). Alternatively, it is possible to integrate a GPS receiver in the PILOTT device. An input is also provided for thermal and/or night vision inputs from any thermal (MWIR and LWIR), SWIR, or night vision scope which can be connected to the housing. This decouples the thermal from the laser spot detector and makes the thermal only for situational awareness. These are overlaid with the optical field of view of the optical scope mounted in the housing so that the complete vision scene as well as all relevant data is displayed for easy observation by the user. This allows for easier use in the field. An optional internal SAASM GPS antenna and receiver may be added for use when a DAGR is unavailable.

Preferably, the PILOTT device is mounted on a stand having controllable actuators to adjust both the direction and tilt of the device for targeting purposes. This provides a stable platform in order to allow the PILOTT device to be used to designate a particular target with a laser beam emitted by the device at a selected frequency, the user to confirm the accuracy of the laser beam designation on the target via the optical field of view with the target location marked or indicated in the display, as well as also providing a GPS location of the target based on its range, compass heading and the GPS location of the device.

Preferably, the housing is designed for field use in military applications, and includes external connectors, such as picatinny rails, for attaching, for example, the thermal vision scope.

BRIEF DESCRIPTION OF THE DRAWING(S)

The foregoing Summary as well as the following detailed description will be readily understood in conjunction with the appended drawings which illustrate preferred embodiments of the invention. In the drawings:

FIG. 5 is a view showing the optical field of view through the PILOTT device.

FIGS. 6-10 show views of different electronic reticles which can be displayed in the optical field of view.

DETAILED DESCRIPTION OF THE PREFERRED EMBODIMENT(S)

Figure 1:
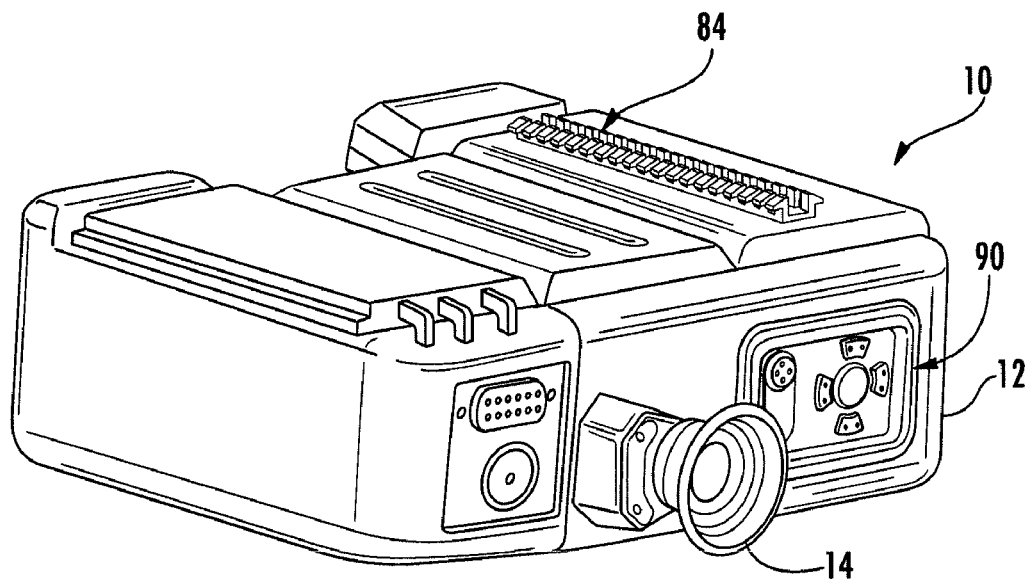
FIG. 1 is a perspective view of a first embodiment of a Portable Integrated Laser Optical Target Tracker and designating (PILOTT) device according to the invention.

Certain terminology is used in the following description for convenience only and is not considered limiting. The words "right," "left," "lower" and "upper" designate directions in the drawings to which reference is made. This terminology includes the words specifically noted above, derivatives thereof and words of similar import. A list of items indicated as "at least one of a, b or c" (where a, b and c represent the specific items referred to) means any one of a, b or c, or various combinations thereof. Additionally, the terms "a" and "one" are defined as including one or more of the referenced items unless specifically noted.

Figure 2:
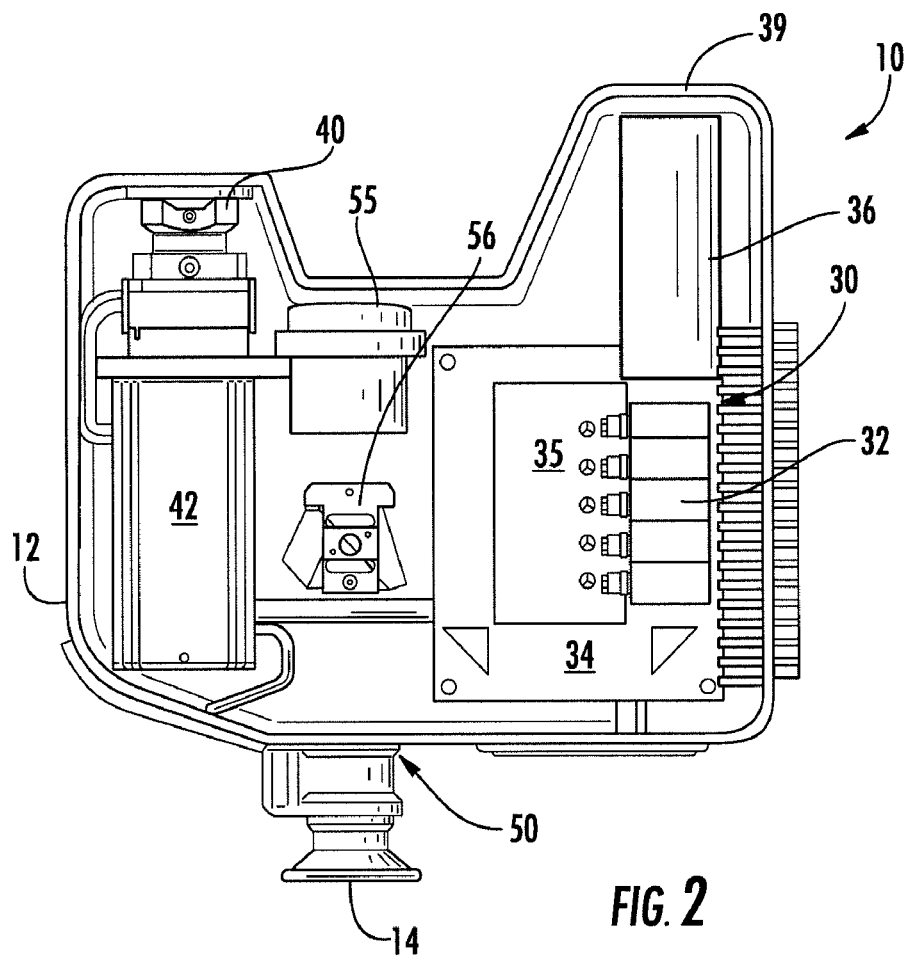
FIG. 2 is a top view thereof with the upper housing cover removed.
Figure 3:
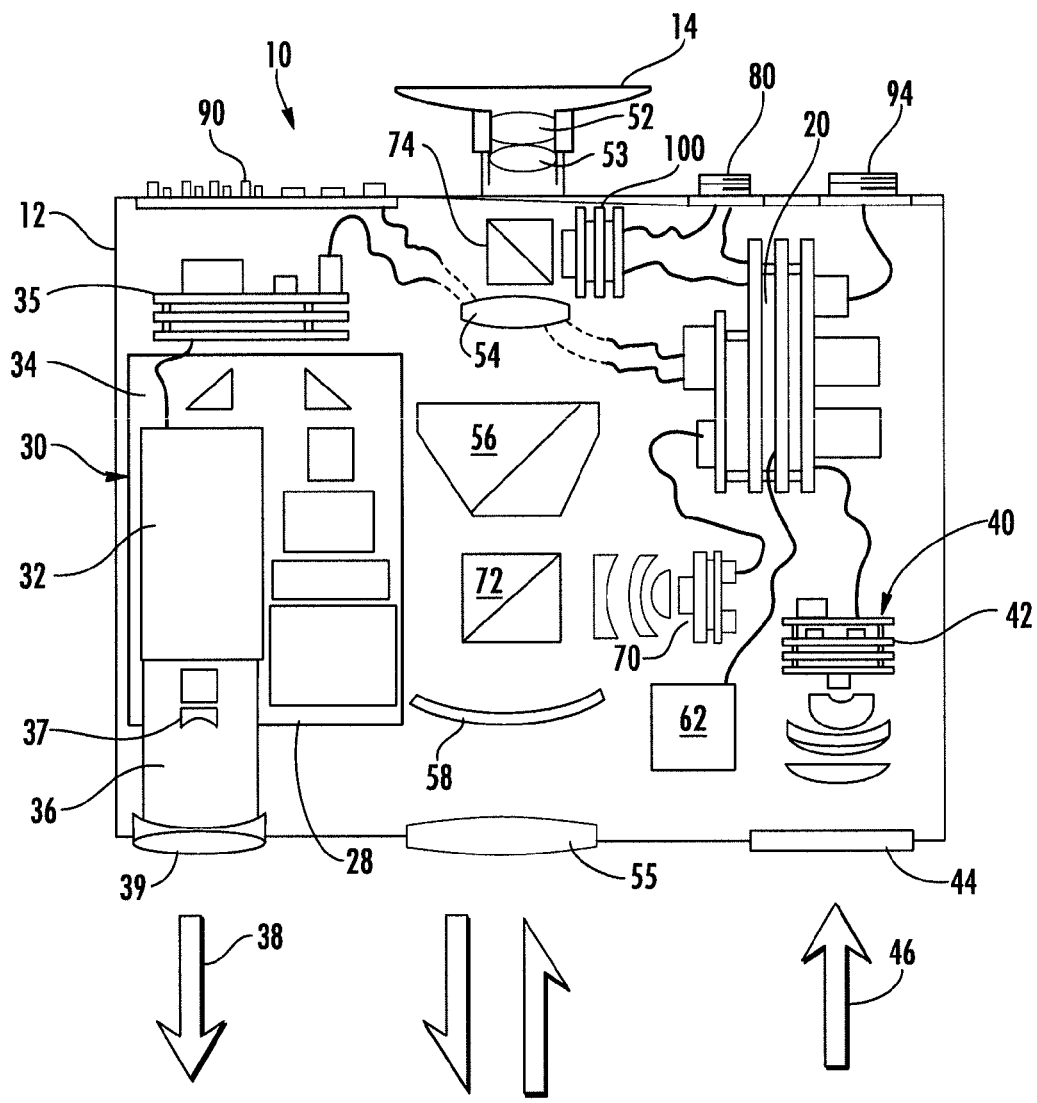
FIG. 3 is a schematic view thereof showing the components of the first embodiment of the PILOTT device.

Referring to FIGS. 1-3, a first embodiment of the PILOTT device 10 is shown. The PILOTT device 10 includes a housing 12, preferably formed as an upper half and a lower half, which are preferably formed of non-magnetic magnesium alloy. However, it can be made of other materials, such as machined or cast aluminum or any other suitable metal or polymeric material. The upper and lower housing halves are preferably sealed together in a water and moisture-proof manner.

A laser designator assembly 30 is located within the housing 12. The laser designator assembly 30 includes a laser beam generator 32, which can be a diode-pumped solid state laser, or any other suitable high intensity laser generator. A laser controller 35 is used to control actuation of the laser and includes a frequency controller which pulses the laser beam 38 that is generated at a user input. The laser controller 35 is preferably a microprocessor, such as Microchip PIC24FJ256 GB106

Preferably, the laser is generated with a wave length of 1064 nm and the pulse width and frequency can be varied. The laser beam 38 is discharged from the laser beam generator 32 into laser beam focusing optics 36, which preferably include at least two lenses 37, 39 which focus the laser beam 38 which is discharged into a tightly focused, highly concentrated beam which can be projected at least 6 km (3.5 miles) for both laser range finding as well as laser designating use. A preferred laser generator and controller are available from LaserPath Technologies. However, any other high intensity laser which produces a pulsed output at 1064 nm could be suitable. Alternatively, a different wavelength laser, such as 1550 nm, which is considered eye safe.

In the preferred embodiment, the laser beam generator 32 and the laser beam focusing optics 36 are mounted on a unitary laser assembly support 28. This is preferably a metal or ceramic plate having sufficient stability for rigid fixed mounting of both the laser beam generator 32 and the focusing optics 36 in relation to each other to prevent movement and also to provide uniform thermal expansion and or contraction based on the heat output from the laser generator 32. In a preferred embodiment a quarter-inch thick plate is used. Preferably, the unitary laser assembly support 28 is mounted to the housing 12 using shock isolators, such as high durometer rubber or polymeric pads to prevent shock on the housing 12 from being transferred to the laser designator assembly 30. The laser controller 35 can be mounted together with or separate from the unitary laser assembly support 28 within the housing 12.

Heat pipes (not shown) may be provided in the housing at or around the laser cavity in order to more effectively remove heat from the laser cavity to external fins built into the bottom side of the housing 12. The heat pipes are of the type known in the art having a conductive attachment to the cavity to provide convective removal of heat via sealed tubes with an internal liquid and conductive transfer to the external housing. Alternatively or in addition, a small internal fan can be used to circulate the heat throughout the housing 12 to dissipate heat.

A thermocouple (not shown) can also be included in the laser cavity to sense the temperature and signal the laser controller 35. If the temperature is too high, the laser generator 32 will be disabled until the temperature is within the operating range. If the temperature is too low, preferably a small kapton heater (not shown) will be turned on to bring the cavity to operating the range.

A laser energy detector 40 is also located within the housing 12 and is used to detect reflected laser energy from a designated target. The reflected laser energy is indicated at arrow 46 in FIG. 3. Preferably, the laser energy detector 40 is a quadrant detector available from Analog Modules, Inc., which includes an energy absorbing surface divided into quadrants which can each detect a relative amount of reflected laser energy. A controller 42 for the quadrant detector 40 is preferably used to determine a specific location of the laser energy based on the quadrant detection and provides a signal to a main controller 20 with location information for the designated target from which the laser beam energy is reflected. Additionally, the quadrant detector controller 42 can detect the frequency of the reflected laser energy 46 to determine if it is in fact the signal transmitted by the PILOTT device 10 or by another (ground or airborne) targeting laser designator assembly for which the PILOTT device 10 is being used to verify the target being designated. As shown in FIG. 3, preferably the quadrant detector 40 is located behind a window 44 in the housing 12.

An optical magnification scope 50 is mounted to the housing 12. The scope preferably includes an eyepiece 14, as shown in FIGS. 1-3 and 16, having an optical field of view as defined by the lenses 52, 53, 55, 56, and 58. While the eyepiece is shown aligned with the lenses along a common axis, it could be angled up by 45 degrees to provide the user more comfort when viewing in a prone position by using a mirror (not shown) along the optical path of the scope 50. Filters 54 and 58 can be provided within the optical view path and an optical path condenser 56 is shown in order to reduce a physical length of the focal distance between the lens position in order to provide a reduced footprint for the housing 12. An optional beam splitter 72 is provided for an optional separate ranging laser energy detector 70 shown in FIG. 3. However, this can be omitted if the quadrant detector 40 is also used for carrying out the range finding function. In a preferred embodiment, the lenses 52, 53, 55, 56, and 58 produce a 12 power scope. However, the magnification can be increased or reduced depending on the lenses selected. Focusing adjustments are preferably also provided by the eyepiece 14.

Figure 4:
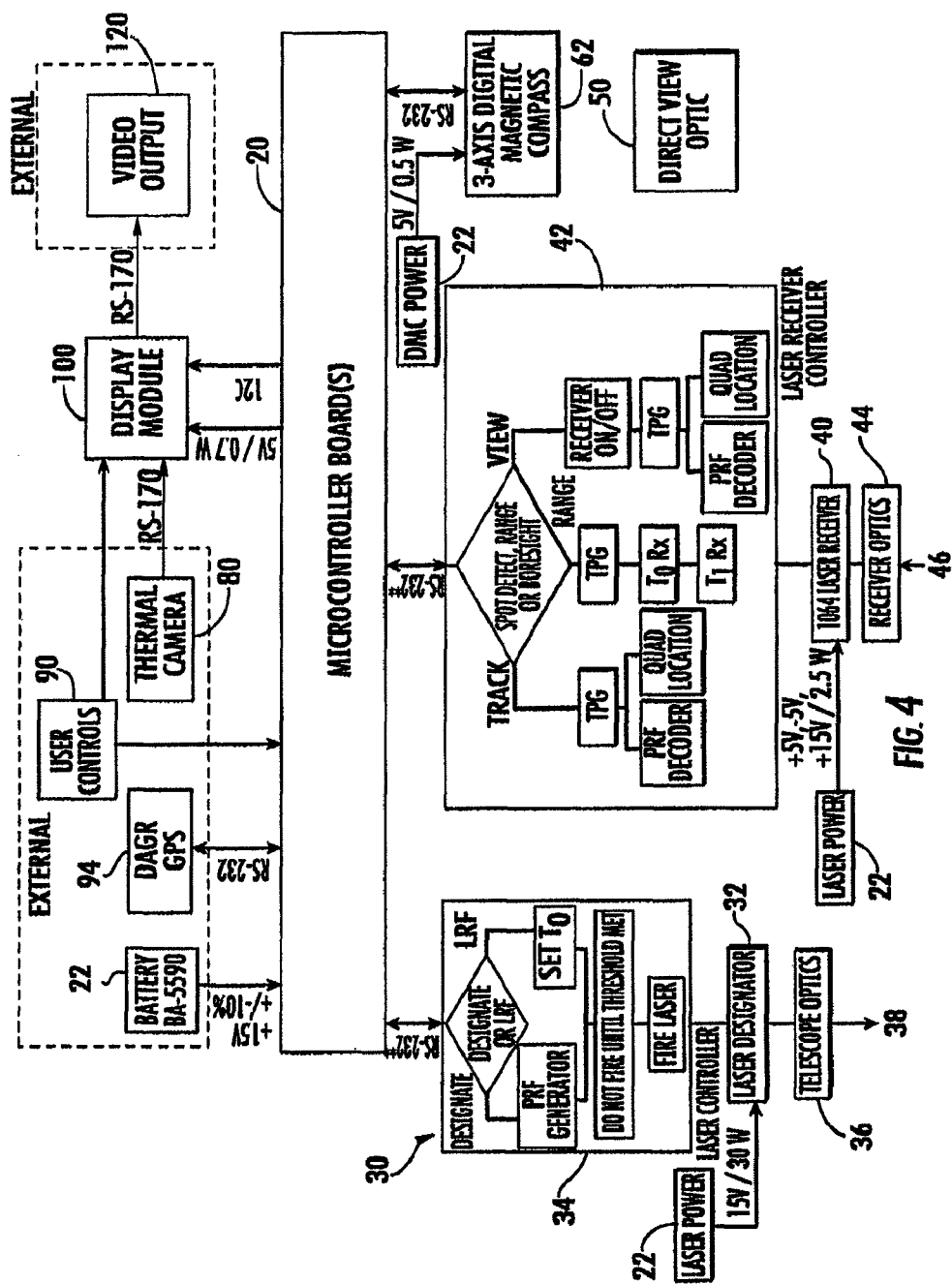
FIG. 4 is a schematic diagram showing the main controller and functional components of the PILOTT device.

Power to the PILOTT device 10 is preferably connected via and external input 22, shown in FIG. 4. The PILOTT device 10 is preferably powered via one BA-5590 lithium battery and will survive the 72 mission life demanded by the US armed forces. In contrast, existing laser designators are highly inefficient and require up to 5 BA-5590 batteries. This provides a tremendous weight saving for the user carrying the device 10 and required battery to a remote spotting or designating location.

As shown best in FIG. 3, a visual electronic display 100 is overlaid with the optical field of view provided by the eyepiece 14 via a beam splitter 74 which allows a signal from a visual electronic display 100 to be overlaid in the beam path. In the preferred embodiment, the display 100 is an organic light emitting diode (OLED) display. Alternatively, a light transmissive LED can be placed directly in the optical field of view. Filters 54 and 58 can be provided to filter out certain wavelengths of light from entering the eyepiece 14. This is optional and may be omitted.

A main controller 20, which is preferably a microcontroller, is also provided within the housing 12. The main controller 20 communicates with the laser controller 35, the laser energy detector controller 42 and the driver/controller 99 for the visual electronic display 100 in order to carry out the functions of the PILOTT device 10.

In the preferred embodiment, a magnetic compass 62 is also located within the housing 12 and provides a bearing direction or heading signal, roll and pitch to the controller 20. One suitable magnetic compass is PNI, TCM6. It is also possible to add an input for an external, highly-accurate system (0.05 degrees=<1 mrad) compass, such as a Ring Laser Gyros (RLG), Fiber Optic Gyros (FOG), Hemispherical Resonating Gyros (HRG), MEMs Gyros or a combination system. These systems will produce less error when performing pin-point GPS-guided bombing missions.

A user input 90, preferably in the form of a touchpad 92 is also provided on the housing 12. This is used for activating the controller 20 and to input specific data to control the function of the PILOTT device 10.

Referring to FIG. 5, the electronic display 100 is shown in detail. The display 100 can be, for example an OLED emagin SVGA3D. However, other suitable displays can be used. The display preferably shows a mode 101 that signals the operator in what mode the device 10 is operating. In the preferred embodiment, there are four modes of operation, including MARK, RANGE, TRACK and STANDBY. The next portion of the display is the "laser on" indicator 102 which signals the operator that the laser is on. This is important in the MARK mode so that the operator knows if a target is being designated.

The display 100 also indicates the number of targets tracked at 103. In the preferred embodiment, the PILOTT device can track up to three targets within its field of view and the display 100 indicates the target being tracked as number X over the total number of targets Y that the detector 40 is detecting, with a maximum of three tracked targets for this embodiment.

The display 100 also indicates the Triservice code at 104, which tells the operator the Triservice code that was entered. The Triservice code, which is preferably set by a look-up table in the laser controller 34, indicates the frequency and pulse width of the laser beam 38 emitted or is being tracked if from a different source. This is important in both the MARK and TRACK modes so that the desired laser reflection 46 is detected by the PILOTT device 10. A signal strength indicator 105 is also provided that displays the strength of the detected signal reflected from the designated target.

In the preferred embodiment, steering indicators 106 are provided which are used by the operator in order to aim the PILOTT device 10 at the proper target for designation. The steering indications 106 can be circular or square corners of a box or dots which are illuminated in each quadrant indicating the location of the designated target from which the reflected laser beam 46 is being detected. Using the steering marks 106, a user can adjust the aim of the PILOTT device 10 so that the designated target is centered in the reticle 108. Preferably, according to the present invention, a laser dot 107 is also indicated that provides the operator with a visual indication of where the laser is actually designating within the optical field of view being observed and within the steering squares. As the PILOTT device 10 itself is moved, this laser dot position 107 shifts. This is important when the PILOTT device 10 is being used to detect and verify a laser designation from a remote source on the target. This can also be used for "bore sighting" the laser beam 38 generated by the laser beam generator 32 of the PILOTT device 10 so that it is centered in the reticle 108. This is done by shifting the reticle 108 to the actual location observed for the laser dot 107 and can be used to fine tune or electronically calibrate the device 10.

One preferred reticle 108 is shown in FIG. 5 and alternate reticles 108A, 108B, 108C, 108D and 108E which can all be electronically generated on the display 100 are shown in FIGS. 6-10. A user can select the desired reticle 108A-108E via the user input 90. Additional reticles can be programmed as required. The reticle is generated by the electronics and overlaid with the direct-view optics using a microdisplay and a beam combiner. The center of the reticle is calculated using the quadrant detector and overlaid on the lased target. Horizontal spacing of the reticle tick marks are calculated using the laser range finder distance and overlaid with 10 meter spacing. Vertical marks of the reticle are preferably spaced at 10 milliradians.

The GPS coordinates of the device 10 are also indicated at 109. The magnetic compass bearing or heading is displayed at 111 based on the input from the compass 62. Additionally, a pitch indicator 112 and roll indicator 113 indicate the degrees of pitch and roll of the device 10 based on an digital magnetic compass 62 in the housing 12 signaling the controller 40 with the inclination information as pitch and roll. This is preferably displayed in degrees with the option of mils and MGRS.

In the preferred embodiment, the display 100 also provides a date/time display 114 as well as a thermal scope indicator 115 which indicates to the user that the thermal camera has been selected in the main menu such that the controller 20 or display controller/driver 99 receives a thermal or any other night image input which can be overlaid on the display 100. The display 100 also provides the range in meters 110 and can be adjusted in 5 meter increments as needed for fire-adjust capabilities. Finally, an aperture indicator 116 indicates whether the aperture is opened or closed and acts as a safety switch (laser interlock, disabling the laser when not fully open).

Addition data can be displayed if desired, depending upon the particular usage and needs or the user.

The controller 20 is also preferably configured to receive input from an external GPS locator, such as a DAGR (Defense Advanced GPS Receiver), which can also provide date and time information, via an external connection. Alternatively, it is possible to integrate a GPS receiver in the PILOTT device, such as a NavAssure 100 (micro SAASM), available from Mayflower Communications. A thermal scope can be mounted on a Picatinny rail 84 located on the housing 12, shown in FIG. 1 and input through the connector 80 shown in FIG. 1. An optional internal SAASM GPS antenna and receiver may be added for use when a DAGR is unavailable.

The controller 20 is preferably programmed to carry out a number of functions for the PILOTT device 10.

The controller 20 provides a laser range finder function which is activated by the operator. In the range finding function, the controller 20 signals the laser controller 34 to emit a single laser pulse 38. The laser energy detector 40 or optionally, if provided a separate range detector sensor 70, receives a reflection 46 of the laser beam from a designated target and transmits a signal to the controller 34 when the reflected laser beam energy is received. The controller 42 calculates a time of flight of the laser beam 46 to and from the designated target and a distance based on the time of flight of the laser beam is then calculated, for example by $T_1 * C/2$, where $T_1$=the time from the initiation of the laser beam to the detection of the reflected laser beam and C=the speed of light. The operating range is preferably from approximately 200 meters to 10 kilometers.

The controller 20 also initiates a laser marking or designation function upon input by the operator. In order to mark or designate a target, an operator inputs a Triservice code (TSC) number via the user input 90 and the laser controller 34 signals the laser beam control 34 to create a designation or marking signal at the desired frequency and pulse width. The laser controller 34 signals the frequency control 35 to the laser designator assembly 30 and the laser beam generator 32 produces a laser beam 46 at the designated frequency and pulse width. A reflected signal 46 is received by the laser energy detector 40 which decodes the signal. The laser detector 40 signals the controller 20 with the decoded triservice code and the controller 20 generates a signal to the display 100 to show the code 104. The laser detector 40 signals the controller 20 with the laser designation location and the controller 20 generates a signal to the display 100 to show a laser dot 107 or appropriate steering information in the optical field of view that indicates where the laser beam 46 is designating.

The laser beam 46 is approximately 80 mJ (class IV) with a pulse width of approximately 10-15 ns. Instead of a Triservice code, it would also be possible to input a desired laser beam pulse width and frequency. Preferably, the laser is operated on a duty cycle which includes a 15 second burst followed by a 45 second cool-down time, which is repeated, preferably 4 times. A longer cool-down time of 15 minutes can then be provided. This entire process can be repeated two or more times.

A further function provided by the PILOTT device is to show an optical detector tracking a laser designator operating at 1064 nm. This allows the user to detect and decode laser energy from a designated target and also allows steering information to the user to aid in locating the designated target. As shown in FIG. 5, this is displayed via the OLED display 100 as laser dot 107 which is located using the quadrant detector and projected via the OLED display 100 in the field of view through the eyepiece 14. Steering information is preferably provided in the form of quarter square bars 106 which can be illuminated or left blank depending upon a direction which the entire PILOTT device 10 must be steered in order to center the laser energy 46 being tracked in the reticle 108.

Referring now to FIG. 4, a simplified block diagram showing the operation of the PILOTT device 10 is illustrated. The controller 20 is shown having the inputs for power 22, GPS 94 and the user input 90. Additionally, the optional thermal image input 80 is shown. The main controller 20 is also shown in communication with the display 100 which receives input from the thermal imager 80 as well as the user input 90. An output from the image display 100 can also be provided as a video out 120 to an external source. The digital compass 62 and the scope 50 are also represented. The laser designator assembly 30 is shown and communicates with the main controller 20, preferably via two digital lines. The main controller 20 must control three data commands for the laser controller 34. Two modes of operation are indicated as "Designate" and "LRF" in the diagram. This decision is based on the user input 90 and places the laser designator assembly 30 in a "Designate" (mark a target) or "LRF" (find range to target) mode. In the designated mode, the frequency is set via frequency controller 35 based on the Triservice code. When the fire command is initiated, the laser continues to laze at the defined pulse width and frequency until a stop command is issued. In the range mode "LRF" an initial time of zero is set. When the user issues a fire command, a single laser pulse 38 is initiated as the laser 30 is fired. The outgoing laser beam 38 is emitted after it passes through the telescope optics regardless of whether it is mark or range function.

A third tracking mode "TRACK" is also available in which the laser is in a standby mode to conserve power.

Still with reference to FIG. 4, a simplified block diagram for the laser detector 40 is also shown. The laser detector 40 preferably communicates with the processor 20 via a serial link. The laser detector controller 42 preferably analyses laser energy received by the detector 40 through the window 44. The processor 20 sends and receives data from the laser detector controller 42 such as the mode, Triservice code, steering information, T zero start (for range), range and receiver off/on. Other system commands may also be sent. The mode function sets the receiver to the MARK, TRACK or RANGE mode. In the marking mode, the quadrant detector 40 detects the reflected laser energy 46 from the laser designator 30. The laser detector controller 42 decodes the laser's pulse frequency and provides the correlated Triservice code. The detector controller 42 also provides the approximate location of the laser designated target as well as the appropriate quadrant steering information to the user via the display 100, preferably using the steering bars 106 as a visual indicator. In a preferred embodiment, the detector 40 can track up to three designators within its field of view.

In the RANGE mode, the detector 40 detects the reflected energy 46 from the internal laser and the time $T_0$ is sent from the laser designator assembly 30 to the detector controller 42 via the main processor 20 and a fiber optic link to initiate a timer. When the laser pulse 46 is received, the timer stops and the range to the target can be determined via the detector controller 42 or via the main controller 20.

Still with reference to FIG. 4, the digital magnetic compass 62 is also shown which communicates with the processor 20, preferably via a RS-232 serial link. The magnetic compass provides heading or bearing data in degrees from 0 degrees to 359.9 degrees. Preferably, field calibration allows the user to compensate for local magnetic fields.

Preferably, the target range and target GPS location are displayed to the user on the visual display 100. In the preferred embodiment, the last five target ranges are stored in memory by the main controller 20. A preferred method for calculating the target GPS coordinates is shown below such that the GPS target coordinates can be displayed to the user on the display 100.

The GPS coordinates of the desired target is displayed preferably using the following data and equations to calculate the target position. The equations are based on The Great Circle Calculations.

Data Points

Unit's GPS Coordinates—latitude and longitude in DD° MM' SS" format from DAGR input 94.

Range to the target—range in kilometers from detector controller 42.

Compass bearing in degrees from digital magnetic compass 62.

Equations

Convert unit's GPS coordinates to a radians format $$Lat\ (or\ Lon) = DD° \ MM'\ or\ SS''$$

$$Lat\ (or\ Lon) = [DD + (MM/60) + (SS/3600)]*pi/180$$

Example

Lat=40° 10' 51.28"
Lat=[40+(10/60)+(51.28/3600)]*pi/180
Lat=40.1809111*pi/180
Lat=0.701289 radians
Lon=75° 7' 51.19" W
Lon=[75+(7/60)+51.19/3600]*pi/180
Lon=76.130886*pi/180
Lon=1.311281 radians
Convert laser range (km) to radians $$D = [RANGE/(circumference\ of\ Earth*2pi)]*pi/180$$

Example

Range=5.42 km
D=[5.42 km/(2*pi*6378 km)]*pi/180
D=0.00849796 radians
Convert compass bearing to radians $$Tc = BEARING*pi/180$$

$$Tp = PITCH*pi/180$$

Example

BEARING=56 degrees
Tc=56*pi/180
Tc=0.9777384 radians
Calculate target latitude, assume Tp=0 degrees $$LAT\_Target = [ASIN[SIN(Lat)*COS(D) + COS(Lat)*SIN(D)*COS(Tc)]]*cos(Tp)$$

Example

LAT_Target=ASIN[SIN(0.701289)*COS (0.000849796)+COS(0.701289)*SIN(D)*COS (0.9777384)]*1=LAT_Target=40.208126 degrees North
or LAT_Target=0.701764 radians.
Positive values are North and negative values are South.
Calculate target longitude $$LON\_Target = [MOD(Lon-ASIN(SIN(Tc)*SIN(D)/COS(LAT\_Target)*180/pi)+180),360)-180]*cos(Tp)$$

MOD function returns the remainder after a number is divided by the divisor.

Example

LON_Target=[MOD (1.311281−ASIN (SIN(0.9777384)* SIN(0.000849796)/COS(0.9777384)*180/pi)+180), 360)−180]*1

LON_Target=75.078031 degrees West
or LON_Target=1.310359 radians.
Positive values are West and negative values are East.
Convert target decimal coordinates to GPS coordinates $$LAT\_Target(DD) = \text{integer value of decimal}$$
$$= INT(decimal)$$

$$LAT\_Target(MM) = \text{integer value of } [(decimal - DD\ value)*60]$$
$$= INT((decimal - DD)*60)$$

$$LAT\_Target(SS) = [(decimal - DD\ value*60) - MM]*60$$

Example $$LAT\_Target = 40.208126\ degrees$$

$$LAT\text{-}Target(DD) = INT(40.208126)$$
$$= 40$$

-continued $$LAT\_Target(MM) = INT((40.208126 - 40) * 60)$$
$$= 12$$
$$LAT\_Target(SS) = [((40.208126 - 40) * 60) - 12] * 60$$
$$= 29.254$$
$$LAT\_Target = 40° \ 12' \ 29.254'' \ N$$
$$LON\_Target = 75.078031 \ degrees$$
$$LON\_Target(DD) = INT(75.078031)$$
$$= 75$$
$$LON\_Target(MM) = INT((75.078031 - 75) * 60)$$
$$= 4$$
$$LON\_Target(SS) = [((75.078031 - 75) * 60) - 4] * 60$$
$$= 40.912$$
$$LON\_Target = 75° \ 4' \ 40.912'' \ W$$

The user controls 90 are preferably as shown in FIG. 1, and include up, down, left and right arrow buttons along with an enter button which allows a user to scroll through the menu which appears on the electronic display 100. When the proper selection is highlighted, a user can either press enter, left or right in order to change selections. The main menu allows a user to select between the modes of operation, MARK, RANGE, TRACK or STANDBY as well as to set the display color for both day and night use. The reticle may also be selected, for example from the reticles 108A-108E provided in FIGS. 6-10. To the extent that a thermal image camera is connected, this can also be set "off" or "on." The Triservice code can also be selected through the main menu from a list of available codes preprogrammed into the processor 20. The user can select or change the code using the up or down buttons or may program in the code number. In the RANGE mode, the range data is displayed, preferably for at least 60 seconds. The last five ranges are preferably stored and the user can access the prior data by pressing the left or right buttons to scroll through the prior data.

It is also possible for the user to align the reticle 108A-108E with the laser dot 107 in order to bore sight the optical scope 50 with the laser beam 38 generated by the laser designator assembly 30. This can be done using the left, right, up or down buttons in the alignment mode. Preferably, the left and right arrows adjust the reticle in one positive step (+X) or negative one step (−X) in the X direction. The step is defined as one pixel in the display. The up and down buttons adjust the reticle in the positive (+Y) or negative (−Y) direction, with a step also being defined as one pixel on the display. Alternatively, an auto alignment can be carried out by the controller 20 in order to automatically center the reticle on the laser dot.

It is also possible to export the targeting data once acquired. This can be done by providing a USB connector on the outside of the housing 12 and passing the data (targeting information) via the USB connector to another device or via wireless (Bluetooth).

Referring to FIGS. 11-18, a second embodiment of the PILOTT device 10' is shown. The second embodiment of the PILOTT device 10' is similar to the first embodiment and the same elements have been designated with the same element numbers. As shown in FIGS. 11-15 and 18, one noticeable difference is that the quadrant detector 40 is located above the optical scope 50 rather than adjacent to it. Two sets of Picatinny rails 84A, 84B are also provided for attaching other devices, such as the thermal, SWIR, or night image scope 86, shown schematically in FIG. 11, to the PILOTT device 10'.

When the thermal image scope 86 is to be used, it is preferably connected to the Picatinny rail 84A located on top of the housing 12' of the PILOTT device 10'. The output from the thermal image scope 86 is directed via connector 80 into the main controller 20 or directly into the optic display controller/driver 99, shown in FIG. 14, which is connected to the main controller 20. The thermal image scope 86 is preferably aligned via the connector system using the Picatinny rail 84A so that it is aligned with the optic field of view. Adjustments can be made in order to ensure proper alignments between the thermal image scope 86 and the optical image. Preferably, the connection between the output 88 from the thermal image scope 86 to the input 80 is via standard connectors.

Figure 11:
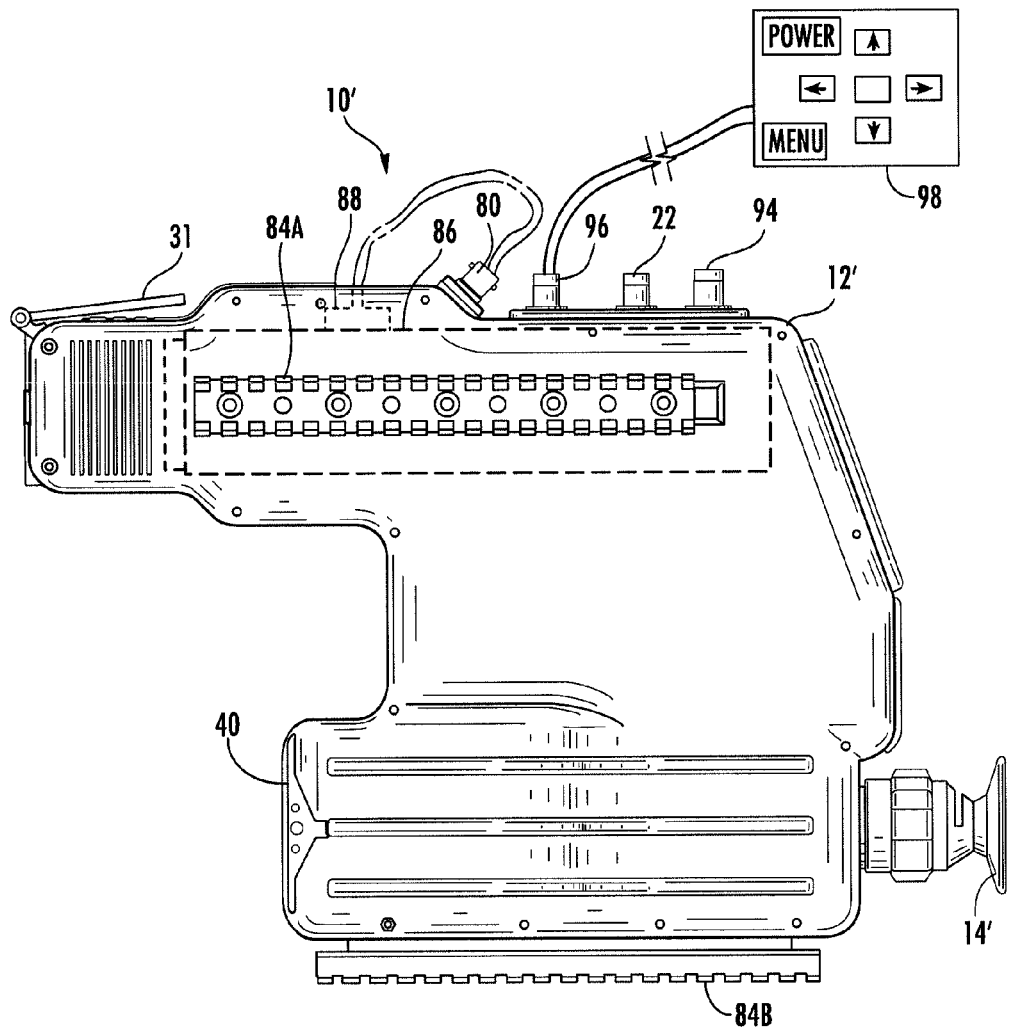
FIG. 11 is a top view of a second embodiment of the PILOTT device according to the invention.

Also shown in FIG. 11 is a user input remote control 98 connected to the remote control jack 94 on the housing 12'. This allows a user to remotely control the PILOTT device 10, 10' with the need for directly handling the unit. This is important as handling the PILOTT device 10, 10' could alter the alignment and therefore change the target either being ranged, spotted or designated via the laser designator assembly 30.

Figure 19:
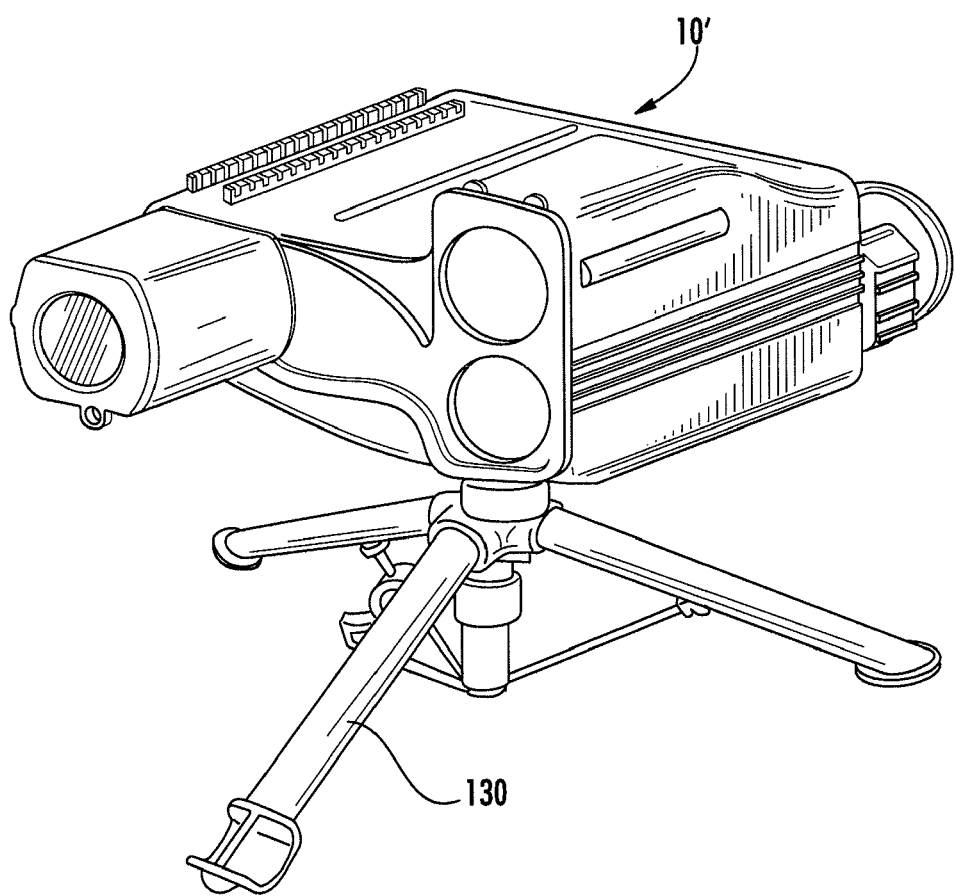
FIG. 19 is a view of a portable adjustable stand that is used to support the PILOTT device in use.

In the preferred embodiment, the PILOTT device 10, 10' is mounted on an adjustable stand 130, shown in FIG. 19, connected to the housing 12, 12'. The stand 130 includes manual actuators for adjusting a position of the PILOTT device 10, 10' in order to align the laser beam 38 and the optical field of view with a desired target. The position of the adjustable stand 130 is performed by the user in order to adjust the position of the device for aiming or targeting. A precision adjustment head can also be provided on the stand 130 for position adjustment, such as the "MINI" manual pan and tilt head from Instro Precision Limited, United Kingdom.

Figure 12:
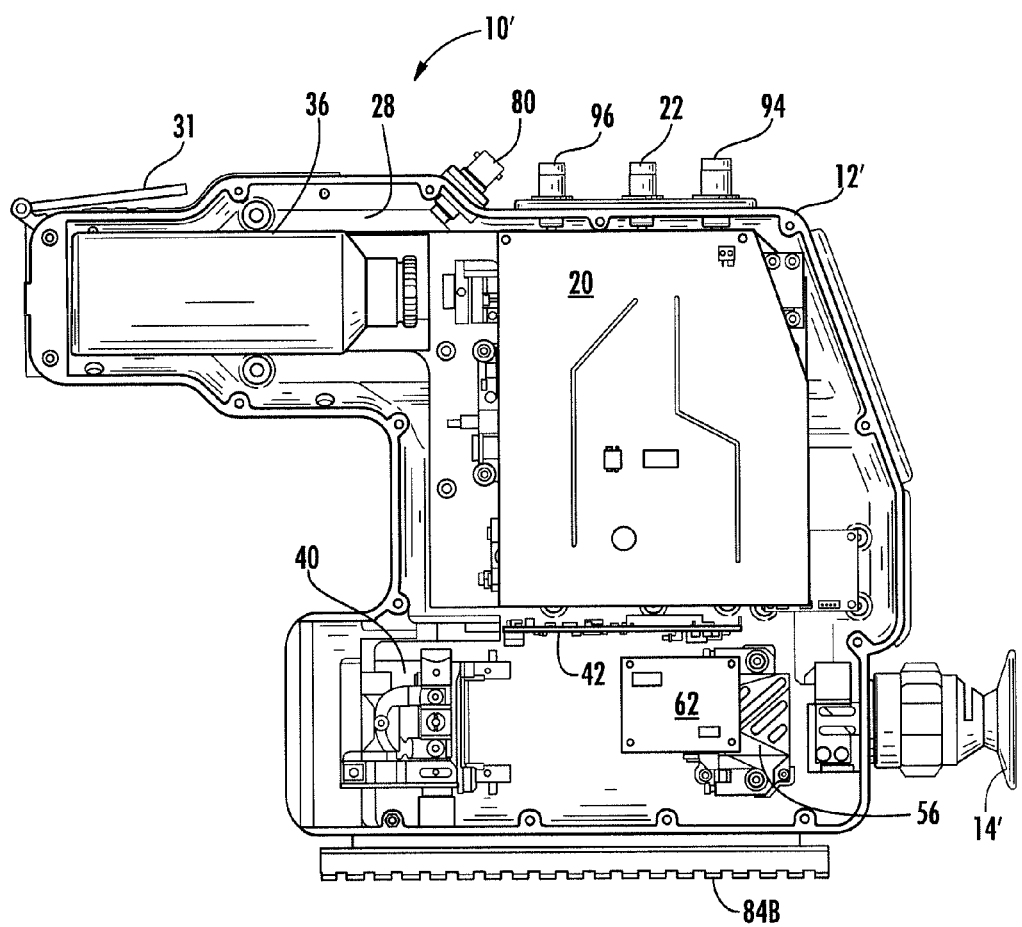
FIG. 12 is a view of the second embodiment of the PILOTT device with the top cover removed.
Figure 13:
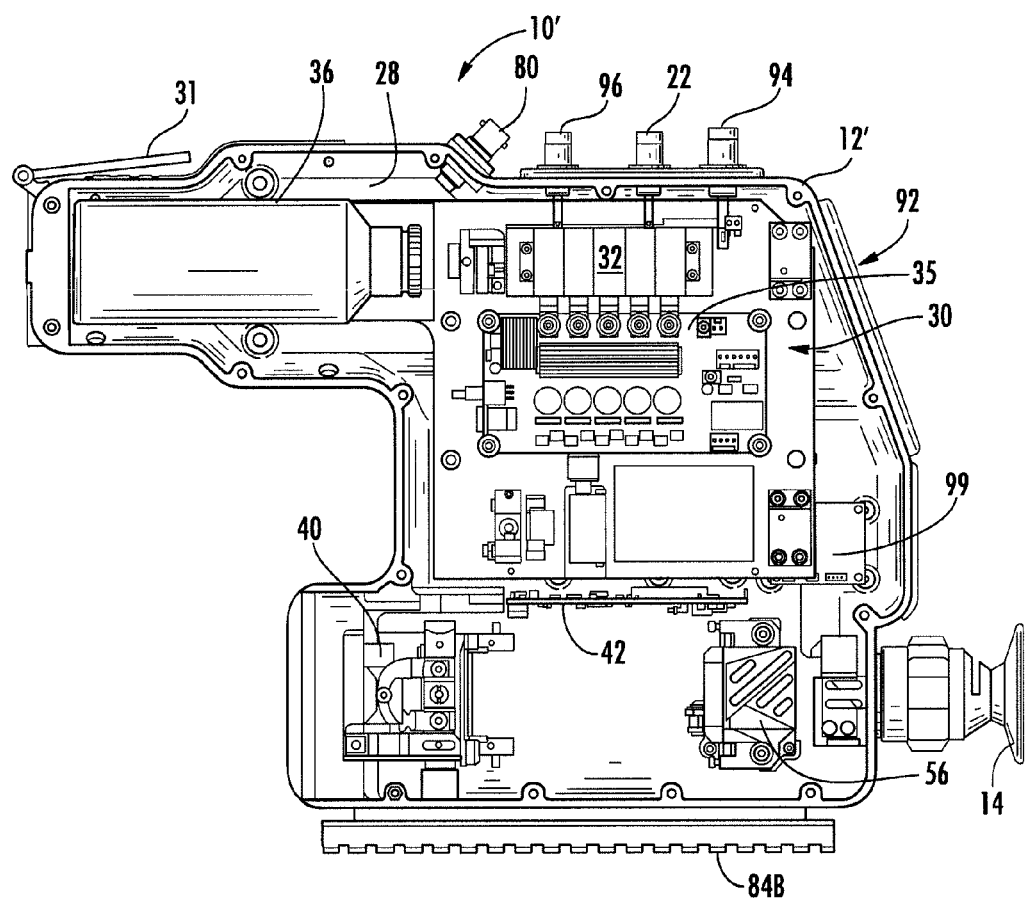
FIG. 13 is a view similar to FIG. 12 with the upper circuit board for the main controller removed.
Figure 14:
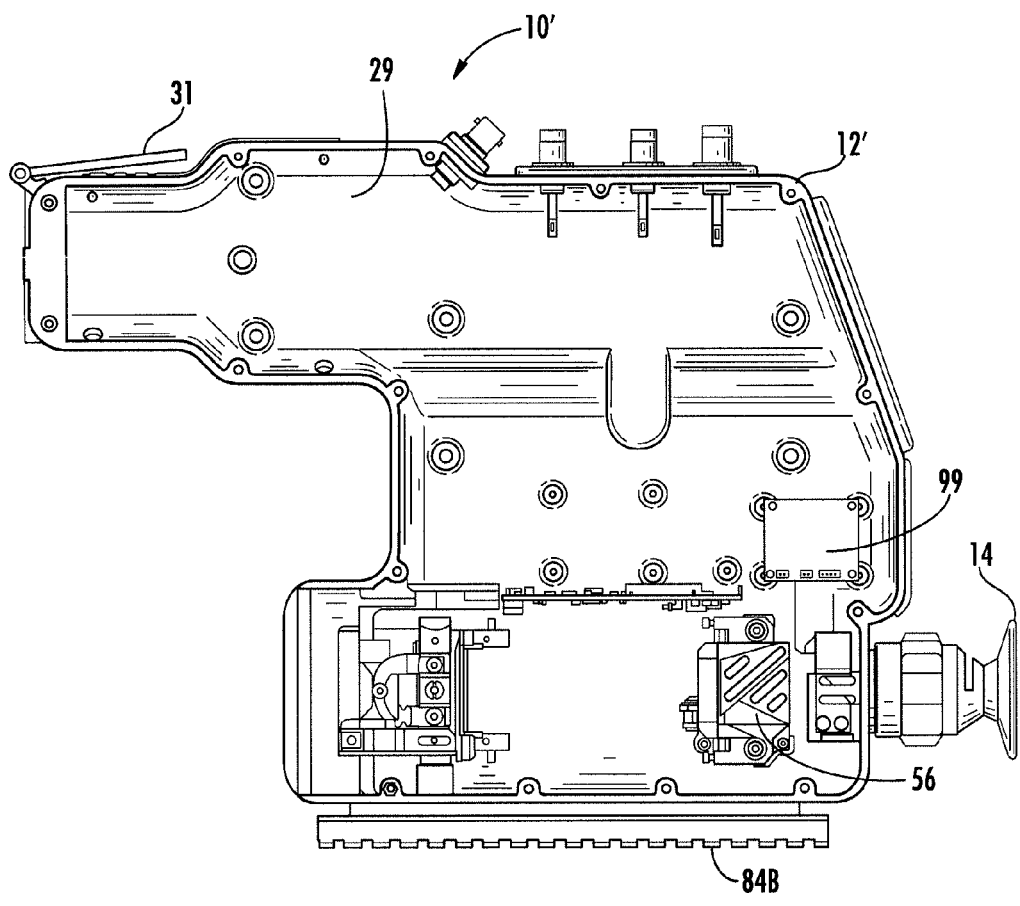
FIG. 14 is a view looking into the bottom half of the housing with the quadrant detector and magnification scope optics located in position.
Figure 15:
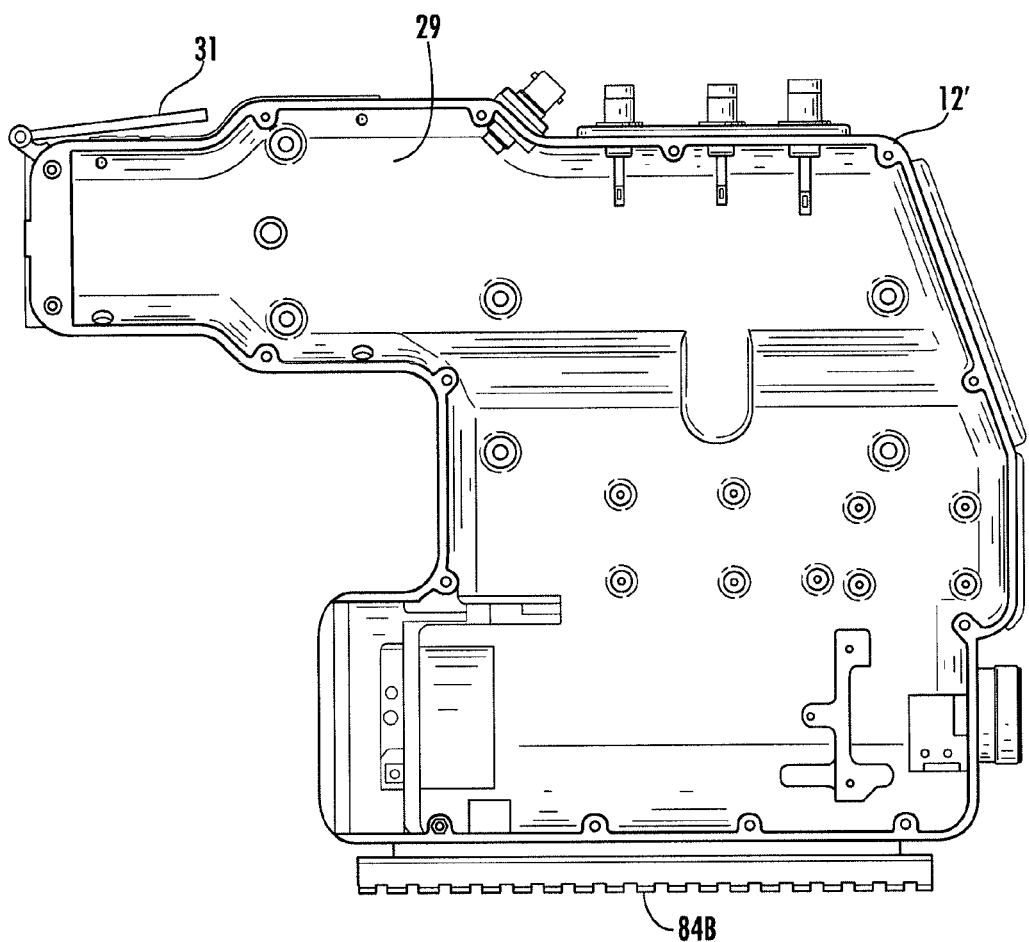
FIG. 15 shows the inside bottom of the housing.

While the arrangement of the components in the PILOTT device 10' is altered slightly from the device 10, the function is the same. As shown in FIGS. 12 and 13, the laser support 28 is used to support both the focusing optics 36 as well as the laser beam generator 32. The digital magnetic compass 62, shown in FIG. 12, is preferably mounted on the underside of the upper housing half along with the main controller 20. The visual display controller 99 is shown in FIG. 14 and is connected to the OLED display 100, which is preferably integrated with the optical path condenser 56.

Figure 16:
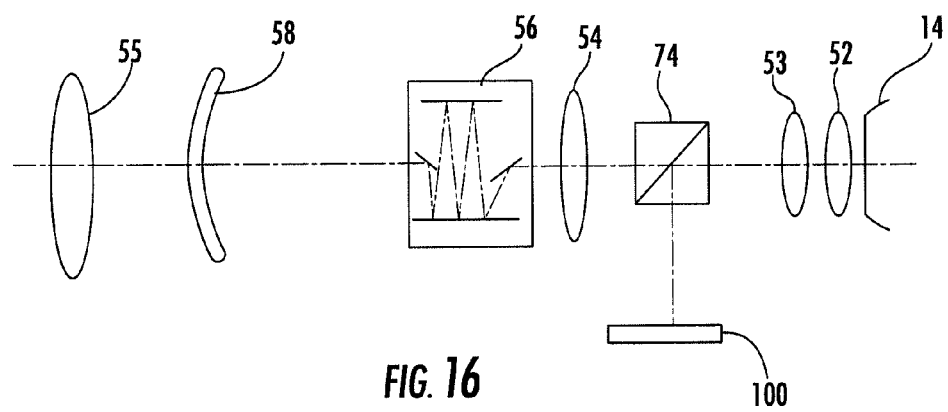
FIG. 16 is a schematic diagram showing the optical magnification scope with an OLED located in the optical field of view.

Referring to FIG. 16, a schematic diagram showing the optical scope components is shown. This includes the eyepiece 14 as well as eyepiece lenses 52, 53. The main objective lens 55 and lens 58 are located at the front of the housing 12, 12'. The optical condenser 56 is also schematically represented separate from a beam splitter 74 which is used to introduce the OLED display into the optical view path. This can be integrated in the optical path condenser 56.

Figure 17:
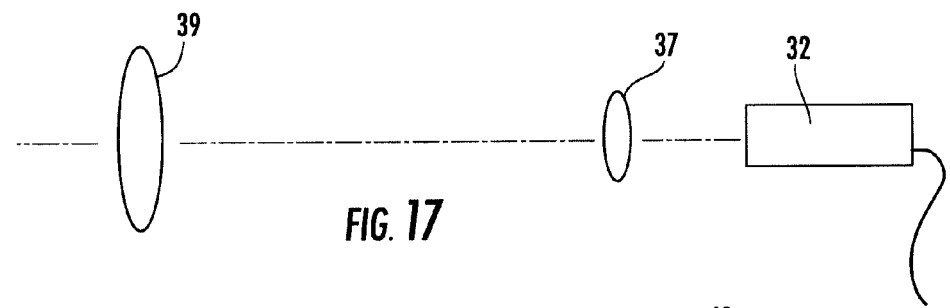
FIG. 17 is a schematic diagram of the laser beam generator and focusing scope.
Figure 18:
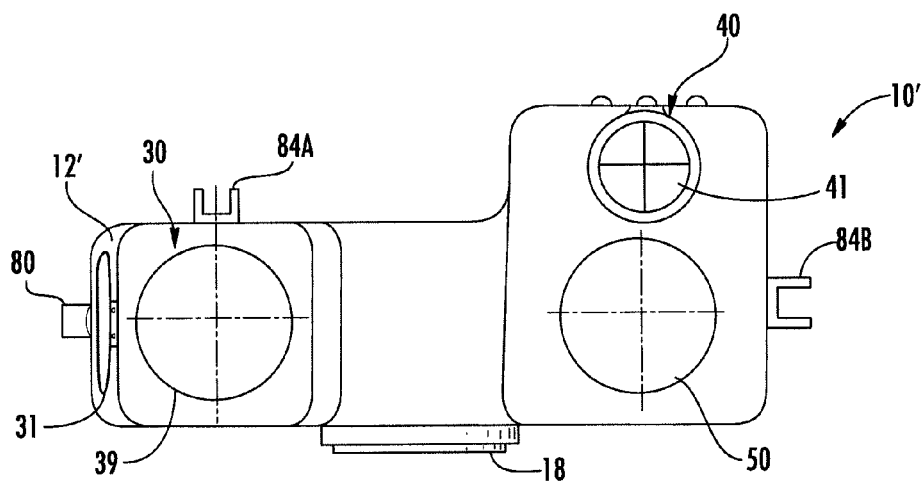
FIG. 18 is a front view of the second embodiment of the PILOTT device shown in FIG. 11.

With respect to FIG. 17, a simplified block diagram of the laser generator 32 along with the focusing lenses 37 and 39 is also shown.

In a further embodiment of the invention, the PILOTT device 10, 10' can also be capable of detecting a position of an enemy laser system such as a designator, a laser jamming system, or a laser beacon. The PILOTT device 10, 10' decodes the enemy laser designator operating frequency using the quadrant detector 40 and controller 42. It is also then possible to return jam and disable an enemy designator by directing the PILOTT laser beam 38 towards the enemy laser source or the target it designates. The frequency of the PILOTT laser beam 38 is randomly shifted by the laser controller 35 to "confuse" or "blind" the enemy laser detector and prevent a target lock.

Overall, the PILOTT device 10, 10' provides an integrated device which can both spot a laser designation (ground or airborne) from a separate source as well as provide both laser designating and ranging capabilities. This is integrated with the GPS location determination for the target and further allows the possibility for overlaying a thermal image via the thermal image scope 86 which can be connected to the PILOTT device 10, 10'. It is further contemplated that the image from a night vision scope could also be integrated into the optical field of view. This device 10, 10' allows an operator to carry a single integrated lightweight device, preferably in the range of 7-9 pounds which provides all of these functions in an integrated package rather than the prior known requirement of carrying three to four different devices which had to be set up and operated separately in order to carry out these functions. This also makes it easier and safer from the operator to retreat from a position without leaving valuable equipment behind.

While the present invention has been described in detail based on the preferred embodiments noted above, those skilled in the art will understand that the invention is not limited to the preferred embodiments described, but rather is defined by the appended claims.

The invention claimed is:

1. Portable integrated laser optical target tracker and designator, comprising:
   a housing;
   a laser designator assembly, including a laser beam generator, a laser controller and laser beam focusing optics to produce a focused laser beam, the laser beam generator and the laser beam focusing optics being mounted on a unitary laser assembly support connected to the housing;
   a laser energy detector that detects reflected laser energy;
   an optical magnification scope mounted in the housing and having an optical field of view that is parallel to and aligned with a beam path defined by the laser beam focusing optics;
   a visual electronic display overlaid with the direct optical field of view;
   a controller that communicates with the laser controller, the laser energy detector, the visual electronic display, GPS device, and compass;
   a 3-axis magnetic compass located in the housing that provides a bearing direction or heading signal and inclination to the controller;
   a user input for activating the controller that is at least one of located on or connected to the housing; and
   the controller is configured to
   (a) range find by signaling the laser controller to emit a single laser pulse, receiving a signal indicating a reflection of laser beam from a designated target has been detected, and calculating a time of flight of the laser beam from and to the designated target and a distance based on the time of flight,
   (b) laser designate a target by receiving a user input frequency, signaling the laser controller to produce and emit a laser beam at the user input frequency, receiving signals from the laser energy detector which detects reflected laser energy at the user input frequency, and generating a signal to the display to show a laser dot in the optical field of view that indicates what the laser beam is designating,
   (c) display an electronic optical reticle in the optical field of view, and
   (d) electronically adjust a reticle position to align the reticle position with the path of the laser beam focusing optics.

2. The portable integrated laser optical target tracker and designator of claim 1, further comprising a thermal (MWIR and LWIR), SWIR or night image input connected to the controller, the controller being further configured to display night image data received from the night image input on the visual electronic display in the optic field of view.

3. The portable integrated laser optical target tracker and designator of claim 2, further comprising a connector located on the housing adapted to receive a thermal, SWIR, or night image scope, a thermal (MWIR and LWIR), SWIR or night image scope mounted to the connector and aligned with the optic field of view, and an output from the thermal, SWIR or night image scope connected to the thermal, SWIR or night image input to the controller.

4. The portable integrated laser optical target tracker and designator of claim 3, wherein the connector comprises a picatinny rail or rails on the housing.

5. The portable integrated laser optical target tracker and designator of claim 1, further comprising a GPS signal input connection on the housing or internally integrated in communication with the controller, the controller being configured to determine a GPS position of a designated target using the distance calculated to the designated target, the bearing direction or heading signal, the inclination signal and a GPS signal of a current location of the device.

6. The portable integrated laser optical target tracker and designator of claim 1, further comprising a remote control connector connected to the housing and in communication with the controller, and a user input remote control connected to the remote control connector.

7. The portable integrated laser optical target tracker and designator of claim 1, further comprising an adjustable stand connected to the housing having actuators for adjusting a position of the housing for aligning the beam path defined by the laser beam focusing optics and the optical field of view with a desired target, and to adjust the position of the housing based on a user input for aiming or targeting.

8. The portable integrated laser optical target tracker and designator of claim 1, wherein the visual electronic display comprises an OLED, and the display is overlaid with the optic field of view via a beam splitter located in the optic path for the optical field of view.

9. The portable integrated laser optical target tracker and designator of claim 1, wherein laser energy detector comprises a laser energy quadrant detector that is configured to determine quadrant position of reflected laser energy being detected.

10. The portable integrated laser optical target tracker and designator of claim 1, wherein the housing is a light-weight housing allowing a total system weight to be 7 to 9 pounds.

11. The portable integrated laser optical target tracker and designator of claim 1, wherein the laser energy detector detects reflected laser energy from any designation source (ground or airborne based), provides accurate steering information, decodes the laser's frequency, and is used as a range finding receiver.

12. The portable integrated laser optical target tracker and designator of claim 1, wherein the controller is adapted to automatically position the reticle based on the laser dot in the optical field of view that indicates what the laser beam is designating to perform an automatic field alignment of the system.

13. The portable integrated laser optical target tracker and designator of claim 1, wherein a movable laser cover is located on the housing over a laser exit path, and a monitor determines a status of the laser cover and is adapted to signal the controller to disable the laser beam generator if the laser cover is not in a completely opened state.

14. The portable integrated laser optical target tracker and designator of claim 1, wherein vertical and horizontal ranging reticle tick marks are shown on the display denoting 10 meter increments (horizontal) and 10 milliradian (vertical) at the target range after the range has been measured.

15. The portable integrated laser optical target tracker and designator of claim 1, wherein the controller is configured to output data via a USB connected with cable or Bluetooth.

16. The portable integrated laser optical target tracker and designator of claim 1, further comprising an integrated camera in the visual path to capture images of the situation and remote the data as well as on screen display information through the USB.

17. The portable integrated laser optical target tracker and designator of claim 1, further comprising a separate range finder laser having an eyesafe laser output in a range of 1550 nm.

* * * * *